UNITED STATES PATENT OFFICE.

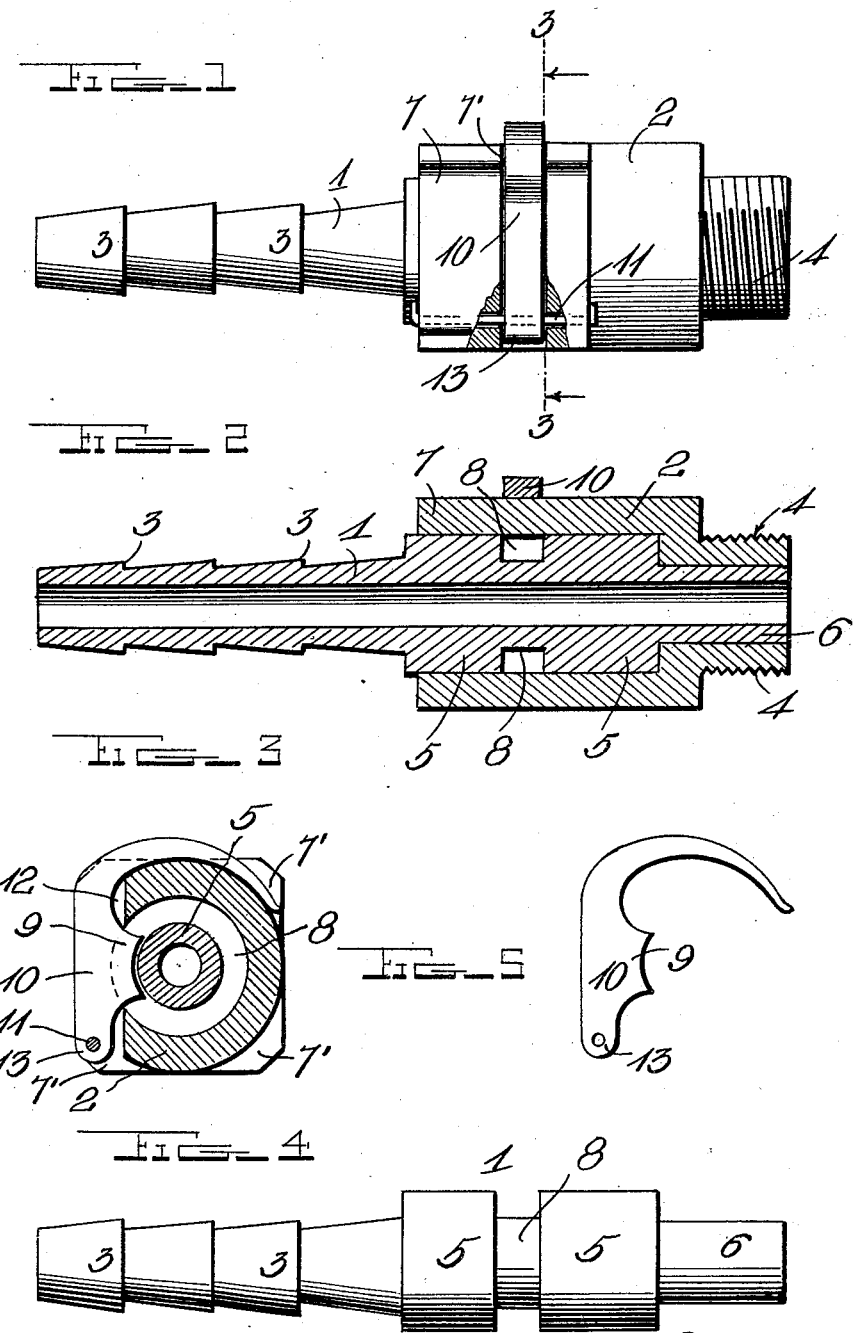

ALEXANDRE HEBERT, OF MONTPELIER, VERMONT.

PNEUMATIC TOOL-COUPLING.

933,561.

Specification of Letters Patent.   Patented Sept. 7, 1909.

Application filed March 11, 1909.   Serial No. 482,731.

*To all whom it may concern:*

Be it known that I, ALEXANDRE HEBERT, a citizen of the United States, residing at Montpelier, in the county of Washington and State of Vermont, have invented certain new and useful Improvements in Pneumatic Tool-Couplings; and I do declare the following to be a full, clear, and exact description of the invention, such as will enable others skilled in the art to which it appertains to make and use the same.

This invention is designed as an improvement on the pipe or hose coupling shown and described in my prior patent 909,790, dated January 12th 1909.

The object of the invention is to provide a device of this class the two members of which have a maximum frictional contact area and a pivoted locking member for securing the two coupling members together having its opposite ends housed in recesses in the outer face of the outer coupling member.

With this and other objects in view, the invention consists of certain novel features of construction, combination and arrangement of parts as will be more fully described and particularly pointed out in the appended claim.

In the accompanying drawings; Figure 1 is a side elevation of this improved pipe or hose coupling; Fig. 2 is a longitudinal section thereof; Fig. 3 is a transverse section taken on the line 3—3 of Fig. 1; Fig. 4 is a detail side elevation of the inner section or member of the coupling; and, Fig. 5 is a detail side elevation of the pivoted locking member.

In the embodiment illustrated the coupling comprises inner and outer tubular sections or members 1, and 2, and a member 10, for locking them together. The inner member 1, is provided at its outer end with a series of annular outwardly extending ribs 3, which serve to retain a hose in position thereon and the outer end of the outer section 2, may be similarly constructed to receive a hose or it may be externally screw-threaded as shown at 4, for the application of a pneumatic tool or the like. The inner member 1, is provided near its inner end with a cylindrical enlargement 5, having a longitudinal reduced extension 6, at its inner terminal. This enlargement 5, is adapted to enter and turn freely in a cylindrical socket formed in the enlarged inner end 7, of the outer section 2, and the extension 6, of said inner member projects into and extends through the outer end of the member 2, to provide a maximum contact surface between the two members 1, and 2, to form a tight joint.

The enlarged inner end 7, of the outer section 2, has an angular outer face preferably made square with the corners thereof provided with segmental recesses 7', arranged to aline with each other. The side walls of one of the recessed corners are provided with registering apertures to receive a pintle 11, on which one end of the locking member 10, is pivotally mounted. This enlarged end 7, of the section 2, is also provided with a radial slot 12, arranged adjacent the corner having the registering apertures therein. The enlargement or head 5, of the inner member 1, is formed with an annular groove 8, arranged intermediately of the ends of said head for the reception of a locking projection 9, formed on the inner edge of the locking member 10, to be described.

The locking member 10, is preferably made substantially semi-circular in form and is constructed of resilient metal and adapted to fit around the exterior of the enlarged end 7, of the section 2, fitting in the recesses formed in the corners thereof. One of the ends of this member 10, is provided with an eye 13, for the passage therethrough of the pintle 11, and the locking projection 9, is arranged adjacent said eye and is adapted to extend through the slot 12, into the groove 8, of the member 1, being engaged on opposite sides by the walls of said groove and thereby preventing longitudinal movement of the inner member relatively to the outer member. The inner face of said projection 9, is curved to fit the curved bottom of the groove 8, to permit the members to turn relatively to each other. The free end of the member 10, is resilient and is adapted to spring around the curved bottom wall of the recess formed in one corner of the member 2. Both ends of this locking member 10 are thereby housed in the recesses of the member 2, and are protected against accidental engagement with adjacent objects which would cause separation of the two members 1, and 2, when not desired. The arrangement of the pivoted end on the pintle mounted in the apertured walls of one of the recessed corners provides a safe and reliable connection and the side walls of the recess serve as braces to hold the end of the locking member against lateral movement.

Owing to the resiliency of the free end of the locking member said member will be effectively retained in its locking position shown in Fig. 3, and may be quickly and easily moved to an inoperative position by simply forcing said end out of its seat and then swinging the member 10, upon its pivot to remove the inwardly extending projection 9, from the groove 8, in the member 1. Thus it will be obvious that the angular formation of the outer face of the head 7 with the segmental recesses in its corners provides a protective housing for the locking member and also a nut like member for engagement by a wrench for connecting and disconnecting the sections 2 from the tool to which it is applied.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

A pipe coupling comprising inner and outer tubular sections the inner section having a cylindrical head formed with an annular groove, the outer section having a cylindrical socket at one end to receive the head of the inner section, the outer face of said socketed end of the outer section being angular and having registering segmental recesses formed in the corners thereof and arranged in alinement around the periphery thereof, the opposite side walls of one of said recesses being apertured to receive a pintle, said outer section being also provided with a radial slot to register with the groove in the inner section when the parts are assembled, an approximately semi-circular locking member constructed of resilient metal and having an eye formed at one end thereof and its outer end curved to yieldably engage the bottom of one of the other recesses, a locking projection formed integral with the locking member on its inner face and adapted to project through the slot in the outer section and to enter the groove in the inner section to lock said sections together, the ends of said locking member being housed in said recesses of the outer member whereby accidental opening of said member is prevented.

In testimony whereof I have hereunto set my hand in presence of two subscribing witnesses.

ALEXANDRE HEBERT.

Witnesses:
 VERNON A. DOTY,
 R. G. FULLER.